G. GUTTENBRUNNER.
LOCK CONSTRUCTION FOR WATERWAYS.
APPLICATION FILED AUG. 27, 1913.
1,107,933.
Patented Aug. 18, 1914.
7 SHEETS—SHEET 1.
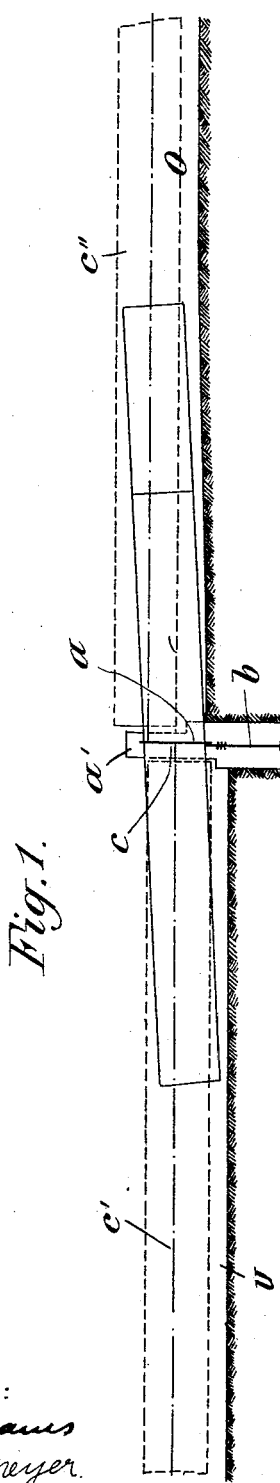
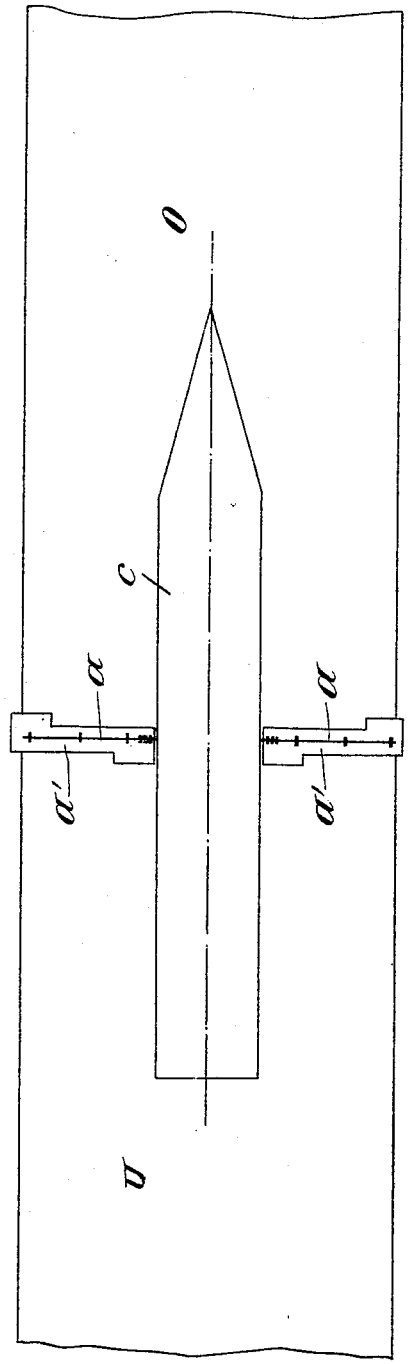

G. GUTTENBRUNNER.
LOCK CONSTRUCTION FOR WATERWAYS.
APPLICATION FILED AUG. 27, 1913.
1,107,933.
Patented Aug. 18, 1914.
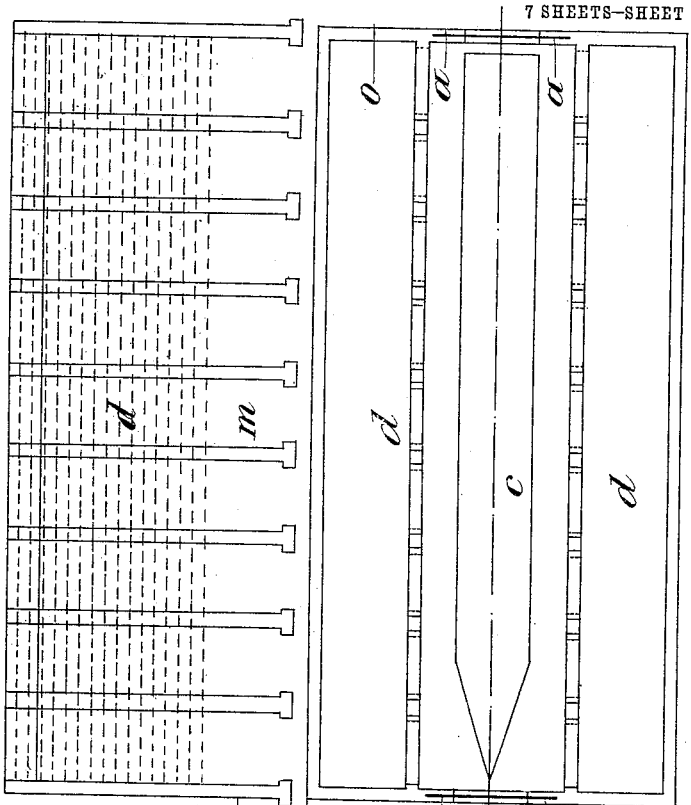
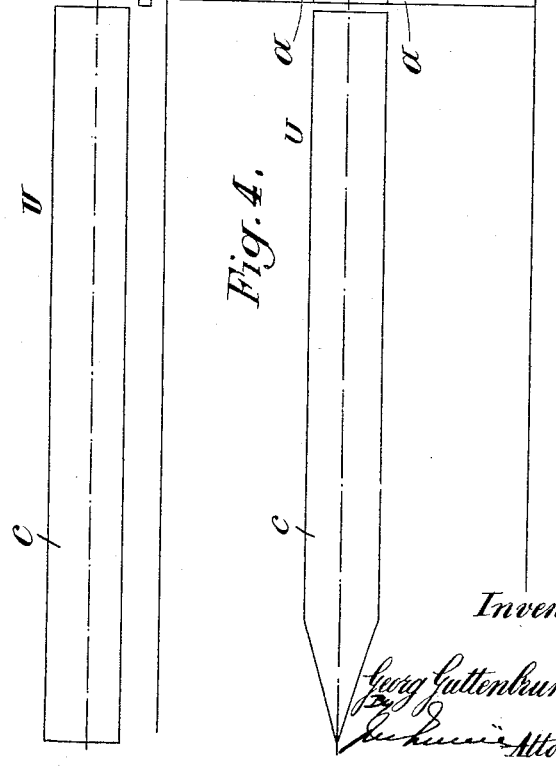

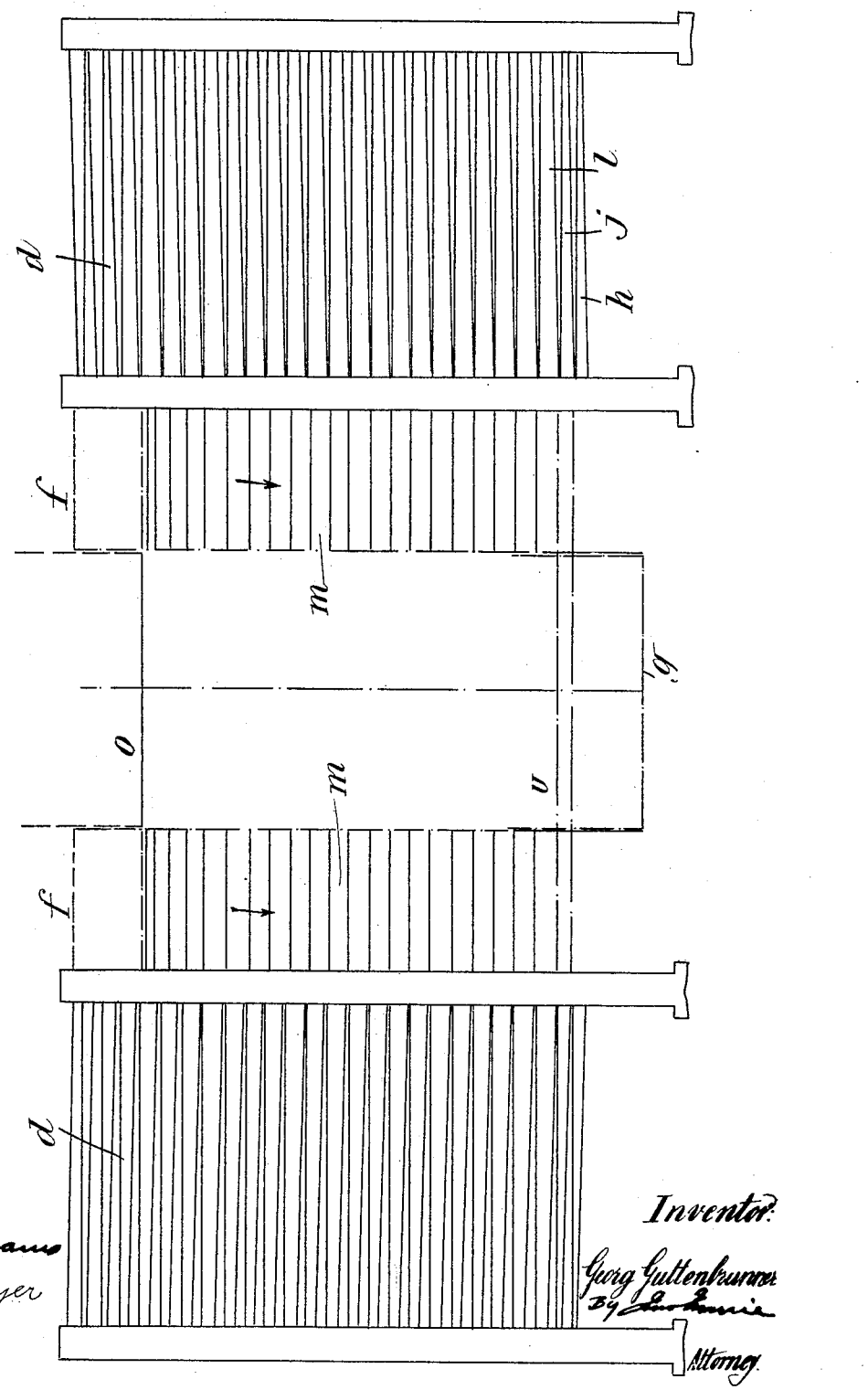

G. GUTTENBRUNNER.
LOCK CONSTRUCTION FOR WATERWAYS.
APPLICATION FILED AUG. 27, 1913.
1,107,933.
Patented Aug. 18, 1914.
7 SHEETS—SHEET 4.
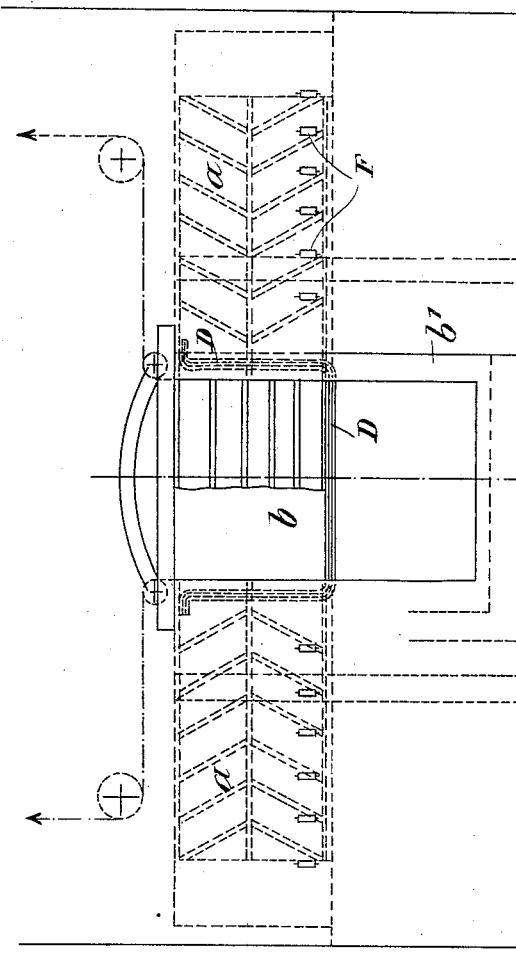
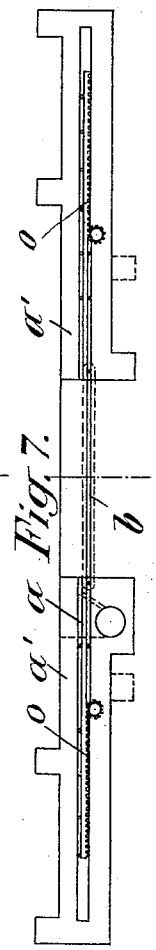

G. GUTTENBRUNNER.
LOCK CONSTRUCTION FOR WATERWAYS.
APPLICATION FILED AUG. 27, 1913.
1,107,933.
Patented Aug. 18, 1914.
7 SHEETS—SHEET 5.
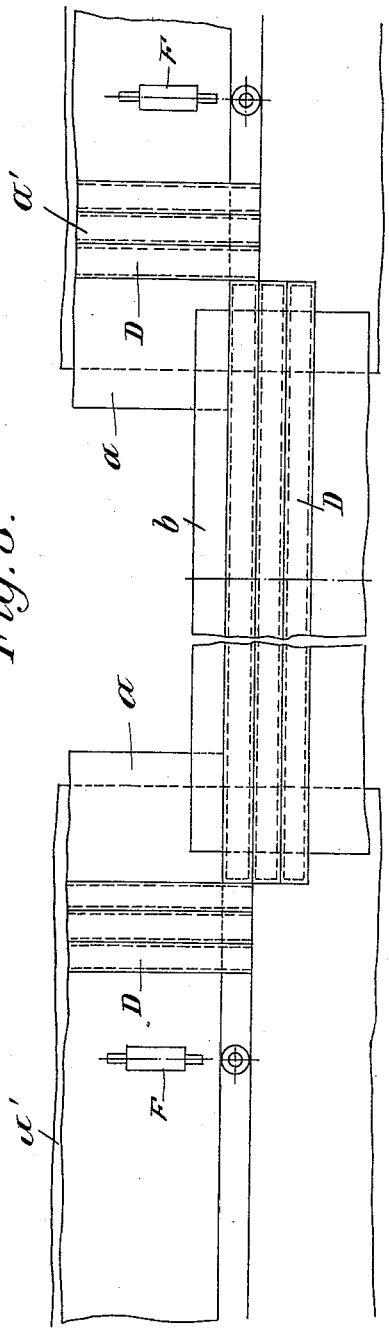
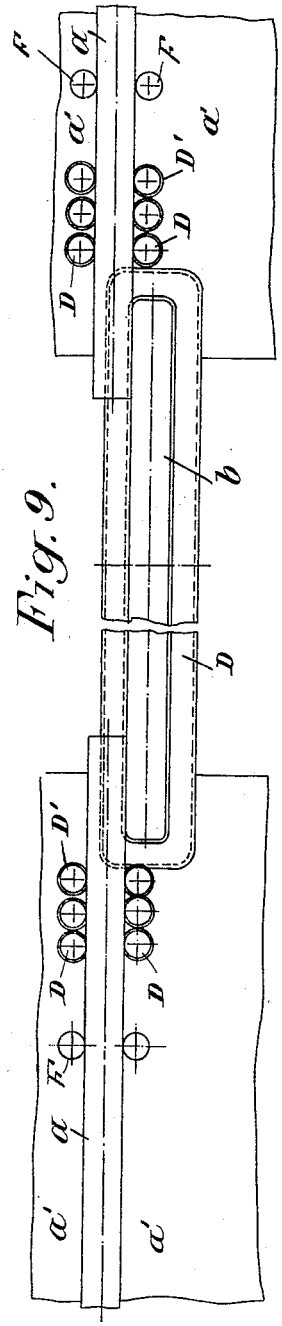

G. GUTTENBRUNNER.
LOCK CONSTRUCTION FOR WATERWAYS.
APPLICATION FILED AUG. 27, 1913.
1,107,933.
Patented Aug. 18, 1914.
7 SHEETS—SHEET 6.
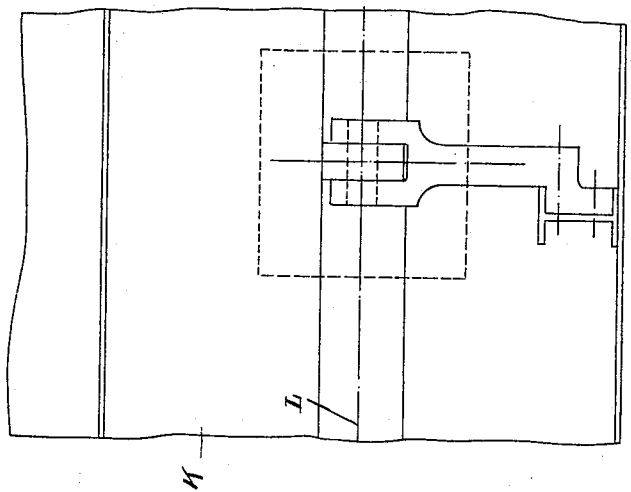
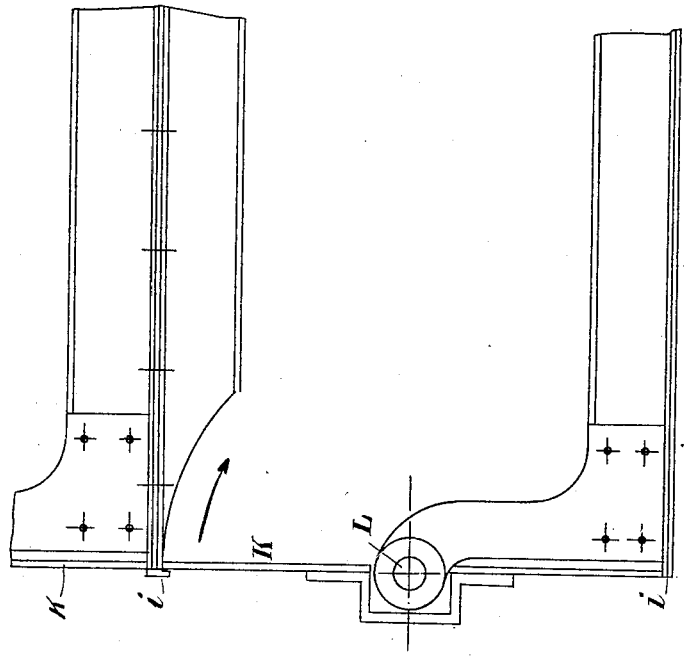
Witnesses:
Inventor:
Georg Guttenbrunner G. GUTTENBRUNNER.
LOCK CONSTRUCTION FOR WATERWAYS.
APPLICATION FILED AUG. 27, 1913.

1,107,933.

Patented Aug. 18, 1914.
7 SHEETS—SHEET 7.

Witnesses:
Inventor
Georg Guttenbrunner
By ____ Attorney.

UNITED STATES PATENT OFFICE.

GEORG GUTTENBRUNNER, OF VIENNA, AUSTRIA-HUNGARY.

LOCK CONSTRUCTION FOR WATERWAYS.

1,107,933.      Specification of Letters Patent.      Patented Aug. 18, 1914.

Application filed August 27, 1913. Serial No. 786,966.

*To all whom it may concern:*

Be it known that I, GEORG GUTTENBRUNNER, a subject of the Austro-Hungarian Emperor, and resident of Vienna, VI, Austria-Hungary, have invented certain new and useful Improvements in Lock Construction for Waterways, of which the following is a specification.

This invention relates to locks the object being to provide a lock construction for waterways which allows of a vessel entering from a water-course into the upper or the lower trough or lock at a small expense of water from the upper trough. This lock construction which when the difference of level between the upper and lower troughs is small is used alone *i. e.* without a lock chamber, but which when the difference of levels is great is mounted in a suitably constructed lock chamber; and is essentially characterized in that the upper trough is separated from the lower trough by shutters which form a lock gate tightly applied against each other under ordinary circumstances, the edges of these shutters being tightly applied against the sides and the bottom of the ship or of a receptacle receiving the ship when passing therethrough and closing again astern of the ship by applying themselves tightly against each other. Thus, when the ship passes through the lock-gate the water is prevented from flowing from the upper trough into the lower one or a part of the water contained in the lock-chamber is raised, by the ship entering the chamber from the upper trough, above the level of the upper trough and can therefore be stored in spare-cells or chambers arranged at a suitable level and can be used again when another vessel proceeds in an upward direction.

Figure 14:
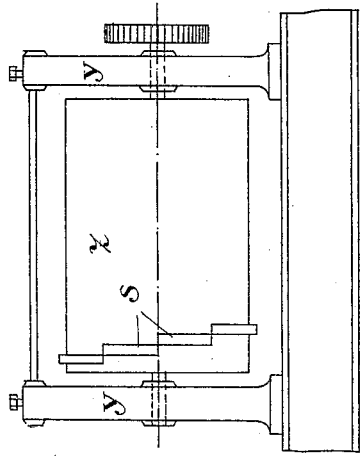
Figure 12:
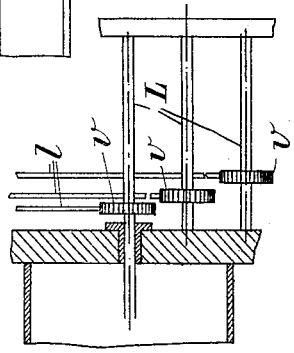
Figure 13:
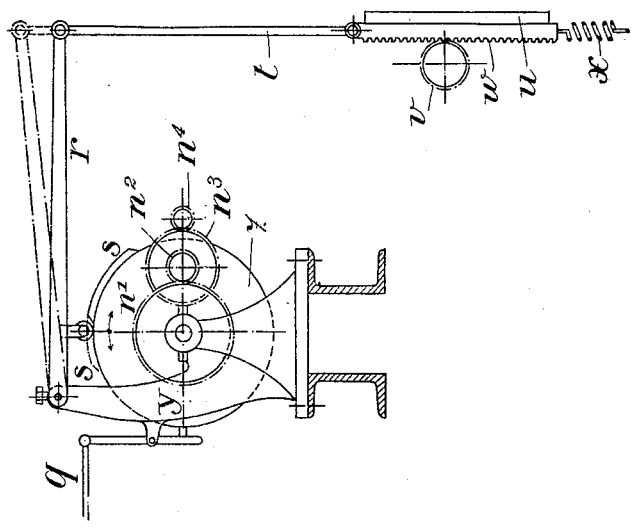

The drawings show diagrammatic views of the lock construction which forms the subject matter of this invention and in these drawings: Figures 1 and 2 show respectively the side elevation and top plan view of the lock construction for small differences in the water levels. Figs. 3 and 4 show side elevation and top plan view of a lock construction for large differences of levels. Fig. 5 shows a cross sectional view of the lock construction shown by Figs. 3 and 4. Figs. 6 and 7 show a side elevation and top plan view of the shutters of a lock gate. Figs. 8 and 9 show a side elevation and top plan view of the packing devices of the shutters. Figs. 10-14 show details of the lock construction.

When the differences of the levels between the upper and lower troughs are small, up to about 2 meters, the lock construction according to the present invention allows of the passage of a ship from one trough into the other one without the aid of a lock chamber. The upper trough O is separated from the lower trough U by two shutters $a$ arranged opposite each other and adapted to be moved in a horizontal direction and by a shutter $b$ applied against the shutters $a$ and adapted to be moved vertically (Figs. 1 and 2). These shutters form together a kind of lock gate. When in the normal position the vertical edges facing each other of the shutters $a$ touch each other in the middle of the canal, the shutter $b$ occupying its uppermost position. When a ship passes through the lock gate, the shutters $a$ are moved outward away from each other by the bow of the boat and the shutter $b$ is pressed downward, the vertical edges of the shutters $a$ being tightly applied against the ship's sides and the upper edge of the shutter $b$ against the ship's bottom. In order to provide a water-tight inclosure around the ship, ships specially built with vertical sides and horizontal bottoms, or similarly constructed receptacles for the ships are made use of which latter receiving the vessel to be passed through the lock like a floating dock which however can be shut at the ends. Furthermore the edges of the shutters $a$ and $b$ which are applied against the ship are provided with packing devices such as for instance hemp or india rubber pads. The shifting of the shutters $a$ during the passage of a ship can either be brought about by the pressure exerted by the ship's sides against its edges as it wedges therebetween or the shutters can be pulled apart but during this motion their edges constantly remain in contact with the ship's sides in proportion as the latter advances. The same remarks apply to shutter $b$. The ship or the ship receiving receptacle can be pulled or pushed through the lock gate, the shutters $a$ and $b$ surrounding the ship's body like a water-tight collar or packing preventing the water from flowing away from the upper trough. Since, as shown by Fig. 1, the ship $c$ passing through the lock gate is inclined, the sides of the ship must have a corresponding height. The shutters $a$ and $b$ are guided in masonry guides $a'$, $b'$, (Figs. 6 and 7) which carry flexible packing cylinders D (Figs. 8 and 9) made of hemp and filled with a greasy material, these cylinders being contained in longitudinally slotted metal tubes $D'$ and applied against the shutters. In order to facilitate the movement of the shutters the latter are mounted between rollers or cylinders F (Figs. 8 and 9).

The lock construction described above not only has the advantage that it prevents any material loss of water from the upper trough, but it so allows of a rapid and continuous passage of the ship. When a lock construction of the kind described is applied to chamber locks for larger lock falls, the passage of the ship through the lock can be effected without any great loss of water from the upper trough, provided the lock chamber be suitably constructed, while in the well known locks with spare chambers at the least the contents of one spare chamber is lost at every passage of a ship and must be replaced by water from the upper trough.

Figs. 3, 4 and 5 show a chamber lock constructed in concordance with this invention. Arranged between the upper trough O and the lock chamber or lock house $m$ is a lock gate which is constructed in a similar way to the one shown by Figs. 1, 2 and 6–9; a similar gate is provided between the lock chamber and the lower trough U. When a ship is warped or pushed from the upper trough O into the lock chamber $m$, the water, owing to its being unable to flow from the lock chamber into the upper trough, rises in the lock chamber above the level of the upper trough O in proportion to the size of the ship. In Fig. 5 the raised water level has been designated by $f$. Owing to this rise of the level the water contained in the lock chamber $m$ can be deposited or stored higher up than was possible with the usual spare lock chambers. Arranged on both sides of the lock chamber $m$ are spare cells $d$ which are not very high (0.5 to 1 meter) and can be separated from the lock chamber $m$ by flaps K indicated by the dotted lines in Fig. 3. These flaps K are similar to the shutters of a window blind and operate to open and close the cells in a similar manner as indicated by the arrow in Fig. 10. In order to obtain a perfectly tight closure the flaps K are provided with packing strips $i$ (Fig. 10). The uppermost cells $d$, as shown by Fig. 5, are positioned at a higher level than the level of the upper trough O, the uppermost cell being positioned at the height of the level $f$ raised by the incoming ship. Now, if after a ship has entered the lock chamber $m$, the flaps K of the uppermost cell $d$ are opened and then in succession the flaps of the following cells, a part of the water is deposited in the uppermost cells at a higher level than the level in the upper trough O. The spare cells $d$ are adapted to receive the totality of water which is allowed to flow out of the lock-chamber $m$, until the ship has gone down to the level of the lower trough U. The ship can then leave the lock through the lower gate and enter the lower trough. After the ship has entered the lower trough the level of the water sinks in the lock chamber under the level of the lower trough. Then, the lock gate being closed, the lower spare cells $h$ and $j$ are emptied into the lock chamber, then the lock gate is opened and the cells $l$ are emptied. The lock-gate of the lower trough can then be left open when a ship has to be taken from the lower trough into the upper one. The ship then enters the lock chamber from the lower trough, the lower lock-gate is shut behind the ship and then the flaps K of the cells $d$ are opened in succession starting from below so that the ship is raised. The water stored above the level of the upper trough U in the uppermost cells $d$ and then flowing back into the lock chamber $m$ raises the ship again to the level of the upper trough. If, however, another ship has to be taken from the upper trough into the lower one, the lower lock gate being shut all the spare cells are opened in succession and their contents emptied into the lock chamber.

In order to allow of the flaps K being opened and closed in the correct order, a drum Z (Figs. 13, 14) driven by a motor through the medium of a gearing $n_1, n_2, n_3, n_4$ (Fig. 13) is provided for each of the two groups of cells positioned at the sides of the lock chamber, the said drum being provided with cams $s$ which are shifted angularly with reference to each other. Each cam coöperates with a lever $r$ which is connected with a rod $t$ carrying teeth $w$ at its lower end. The flaps K of the cells $d$ are arranged on shafts L (Figs. 10, 11, 12) each of which carries a toothed wheel $v$ (Figs. 12 and 13) which is rotated by means of the toothed rack $w$ by a cam $s$ on the drum Z. The cams $s$ are shifted angularly with reference to each other on the drum Z in such a manner that according to the direction of rotation of the drum Z the flaps K are opened in succession starting from the top or from the bottom. The rods $t$ are acted upon by springs X (Fig. 13) which after one of the cams $s$ has passed the corresponding lever $r$ pulls the rod $t$ and the lever $r$ back into the starting position thus closing the corresponding flap K.

Having now fully described my said invention, what I claim and desire to secure by Letters Patent, is:

1. In a lock construction the combination with the upper trough and the lower trough of shutters adapted to be applied tightly against each other and to form a lock gate, the edges of said shutters being adapted to be applied tightly against the sides and bottom of a vessel passing through the lock, and means for causing the said shutters to close again astern of the passing vessel so that during the passage of the vessel through the lock-gate no water can flow from the upper trough into the lower one, substantially as described.

2. In a lock construction the combination with the upper and lower troughs of a lock chamber, lock gates separating the lock chamber from the upper and lower troughs and formed by shutters the edges of which are adapted to be applied against the sides and bottom of a vessel passing through the gate, means for causing the said shutters to close astern of the passing vessel, so that a part of the water entering the lock chamber from the upper trough is raised above the level of the upper trough, and spare cells (d) arranged at a correspondingly high level and adapted to receive the said part of water raised, substantially as described.

3. In a lock construction the combination with the lock-chamber of lock gates formed by shutters adapted to be applied against the sides and bottom of a passing vessel, spare cells (d) of the well known type arranged on both sides of the lock chamber immediately above each other, flaps (K) adapted to establish and suppress a communication between the said lock-chamber and the said cells, the uppermost cells being positioned so much higher than the level of the upper trough as, owing to the displacement of water by the vessel passing through the lock-gate, the level of water is raised in the said lock-chamber, substantially as and for the purpose set forth.

4. In a lock construction the combination with the upper and lower troughs of a lock gate formed by shutters adapted to be applied against the bottom and sides of a passing vessel and to close astern of the latter, guides for the said shutters, flexible tubes filled with a greasy substance and mounted in said guides and adapted to be applied tightly against the said shutters, and metal sleeves provided with slots and adapted to receive the said flexible tubes, substantially as and for the purpose set forth.

5. In a lock construction the combination with the upper and lower troughs and the lock chamber of lock gates separating said lock chambers from the said upper and lower trough and formed by shutters adapted to be applied against the bottom and sides of a passing vessel and to close astern of the latter, guides for the said shutters, flexible tubes filled with a greasy material and mounted in the said guides and adapted to be applied tightly against the said shutters and means provided with slots and adapted to receive the said flexible tubes, substantially as and for the purpose set forth.

In testimony whereof I have hereunto set my hand in presence of two witnesses.

GEORG GUTTENBRUNNER.

Witnesses:
ROGER AMES BURR,
AUGUST RUEGG.

---

Copies of this patent may be obtained for five cents each, by addressing the "Commissioner of Patents, Washington, D. C."